US008184217B1

United States Patent
Galstian et al.

(10) Patent No.: US 8,184,217 B1
(45) Date of Patent: May 22, 2012

(54) THERMAL LIQUID CRYSTAL OPTICAL DEVICE

(75) Inventors: Tigran Galstian, Québec (CA); Armen Zohrabyan, Quebec (CA); Karen Asatryan, Québec (CA); Amir Tork, Quebec (CA); Vladimir Presniakov, Québec (CA); Aram Bagramyan, Québec (CA)

(73) Assignee: LensVector Inc., Mountain View, CA (US)

( * ) Notice: Subject to any disclaimer, the term of this patent is extended or adjusted under 35 U.S.C. 154(b) by 118 days.

(21) Appl. No.: 12/844,957

(22) Filed: Jul. 28, 2010

Related U.S. Application Data (60) Provisional application No. 61/229,013, filed on Jul. 28, 2009.

(51) Int. Cl.
*G02F 1/1335* (2006.01)
(52) U.S. Cl. .......................................................... 349/18
(58) Field of Classification Search ..................... 349/18
See application file for complete search history.

*Primary Examiner* — Phu Vu
(74) *Attorney, Agent, or Firm* — Anglehart et al.

(57) ABSTRACT

A variable optical device for controlling the propagation of light has a body of liquid crystal optical material with a center and a periphery, a heating system including an electrically controllable heat source and a thermal radiator arranged at the periphery for cooling a portion of the body of material. The heating system is operative to generate a spatially modulated temperature gradient and to provide a desired light propagation behavior.

15 Claims, 9 Drawing Sheets

THERMAL LIQUID CRYSTAL OPTICAL DEVICE

TECHNICAL FIELD

The present invention relates to the field of tunable liquid crystal optical devices.

GENERAL DESCRIPTION

The refractive index of a material is usually proportional to the density of the material. Accordingly, since most materials expand upon heating, the refractive index of most materials decreases with increasing temperature. This is not the case for specific ordered materials, such as oriented liquid crystals (LC), since the ordering of LC molecules can drastically change their optical properties. Thus, the extraordinary polarized light will usually see different refractive index $n_e$ compared to the ordinary polarized light, which will see ordinary refractive index $n_o$. Consequently, the degradation of that ordering due to the heat may also generate corresponding modulations of its refractive index. In the case of positive anisotropy ($n_e > n_o$) the heat may reduce the $n_e$ but increase $n_o$. In fact, different LCs will have different behaviors in different temperature ranges (e.g., in some cases, both $n_e$ and $n_o$ may be decreasing with increasing temperature, etc.). The corresponding refractive index variations (with temperature) in those kinds of materials may be very strong. Differentially heating a uniform body of material will lead to a gradient in the refractive index of the material corresponding to the temperature gradient in the material. More specifically, in the above mentioned example, the refractive index $n_e$ will be lowest where the greatest increase in temperature occurs.

It follows that, for materials with temperature sensitive optical properties, such as liquid crystals, a lensing effect can be created by taking advantage of the temperature dependence of the refractive index of the material.

Figure 1:
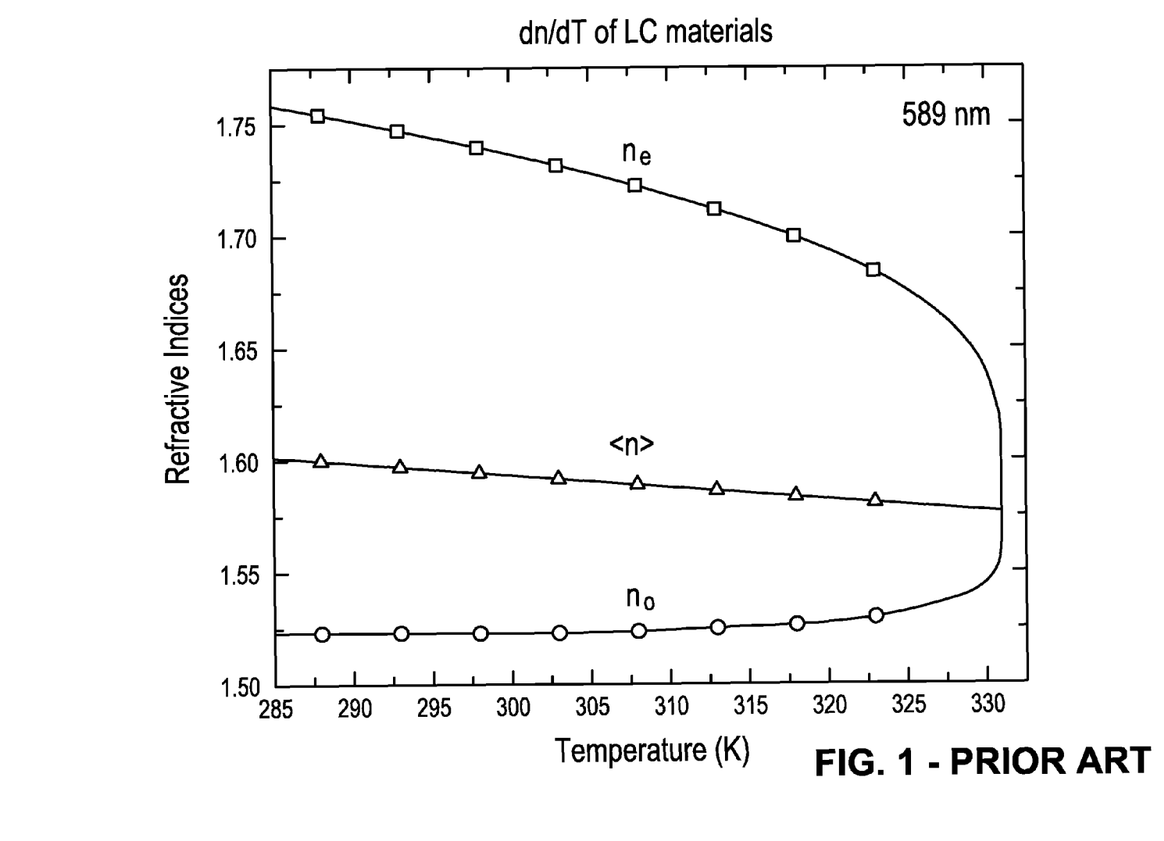
FIG. 1 illustrates a prior art example of the temperature-dependent refractive index of a liquid crystal material.

FIG. 1 illustrates a typical example of the temperature dependence of the refractive index (n) of a liquid crystal material. The experimental results reveal the material's dn/dT, which is higher for some materials than for others.

Figure 2:
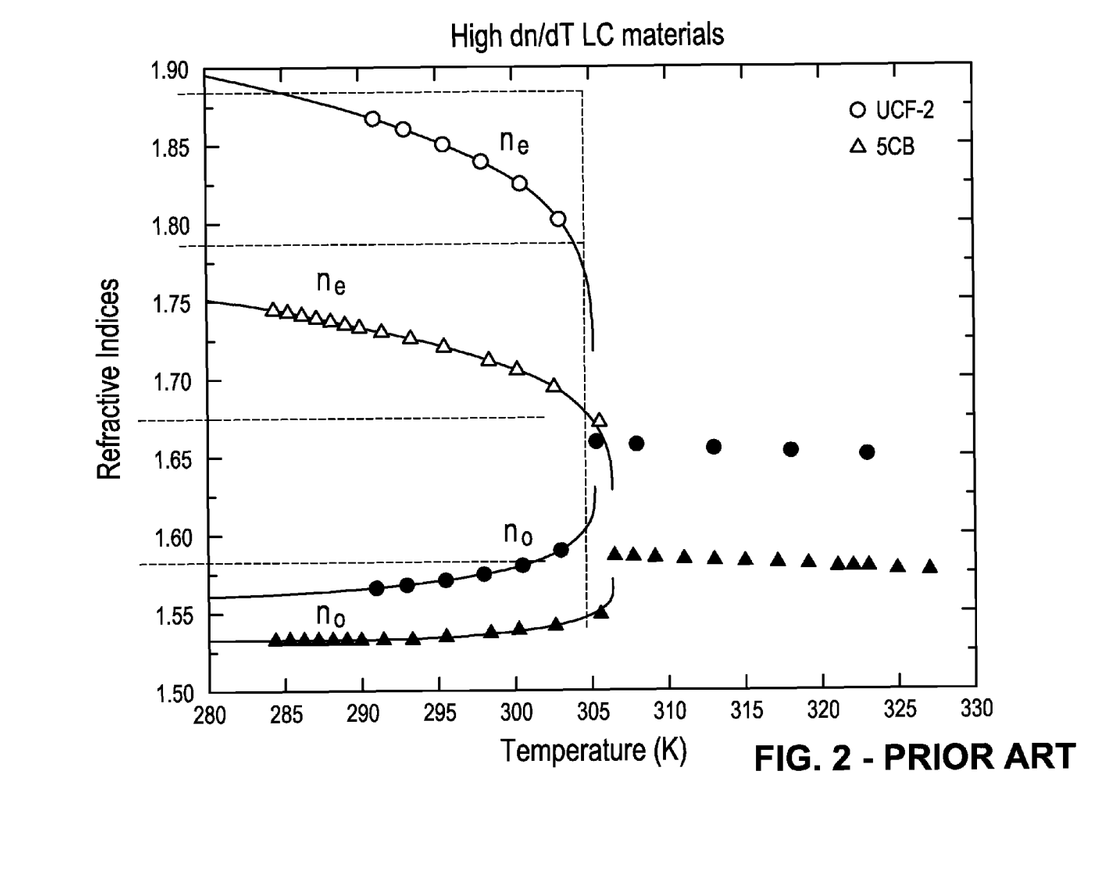
FIG. 2 illustrates a prior art example of the temperature-dependent refractive indices of high do/dT liquid crystal materials.

FIG. 2 illustrates an example of the temperature-dependent refractive indices for two different liquid crystal materials. In this case, both materials are high temperature-gradient refractive index (dn/dT) liquid crystal materials. The experimental results reveal that, for such materials, an important change in refractive index can be obtained for a relatively small change in temperature.

The following are rough estimations of temperature dependent optical power, taking for example certain predefined material parameters:

Material Data:
  Going from room temperature T to isotropic phase, we can change the n by almost $\Delta n = 0.1$
  Let us suppose we use the half of the above mentioned range, the slope becomes: $0.05/20°\,C. = 2.5 \times 10^{-3}/°\,C.$
  LC film thickness is $h = 50$ um
Optical Basics:
  Optical Power (OP) $= 2 (\Delta n\, h)/r^2$
  We need to have 10 diopters (OP $= 1/0.1$ m $= 1/100$ mm).
  For $r = 0.87$ mm, between 40 and 80° C. (giving a total of $\Delta n = 40°\,C. \times 2.5 \times 10^{-3}/°\,C. \approx 0.1$), OP $= 2 \times 0.1 \times 0.05$ mm$/0.757$ mm$^2 = 0.0132$/mm $= 13$ Diopters.

Thus the non uniform heating of a high dn/dT material in order to produce a lensing effect could be a cost-effective way of producing tunable lenses.

SUMMARY

The present invention provides a novel heating system for generating a thermally actuated optical lens, and the use of this heating system to create a tunable liquid crystal lens, as well as modules and devices made thereof.

BRIEF DESCRIPTION OF THE DRAWINGS

The invention will be better understood by way of the following detailed description of embodiments of the invention with reference to the appended drawings, in which.

DETAILED DESCRIPTION

The present invention is directed to a novel heating system for generating a thermally actuated optical lens, and the use of this heating system to create a tunable liquid crystal lens, as well as modules and devices made thereof.

In order to have differential refractive index modulation and corresponding lensing effect when heating a liquid crystal body of material arranged in a lens configuration, we need:

1—Appropriate thermal conduction and diffusion across the lens aperture; and
2—different temperatures across the aperture.

Figure 3:
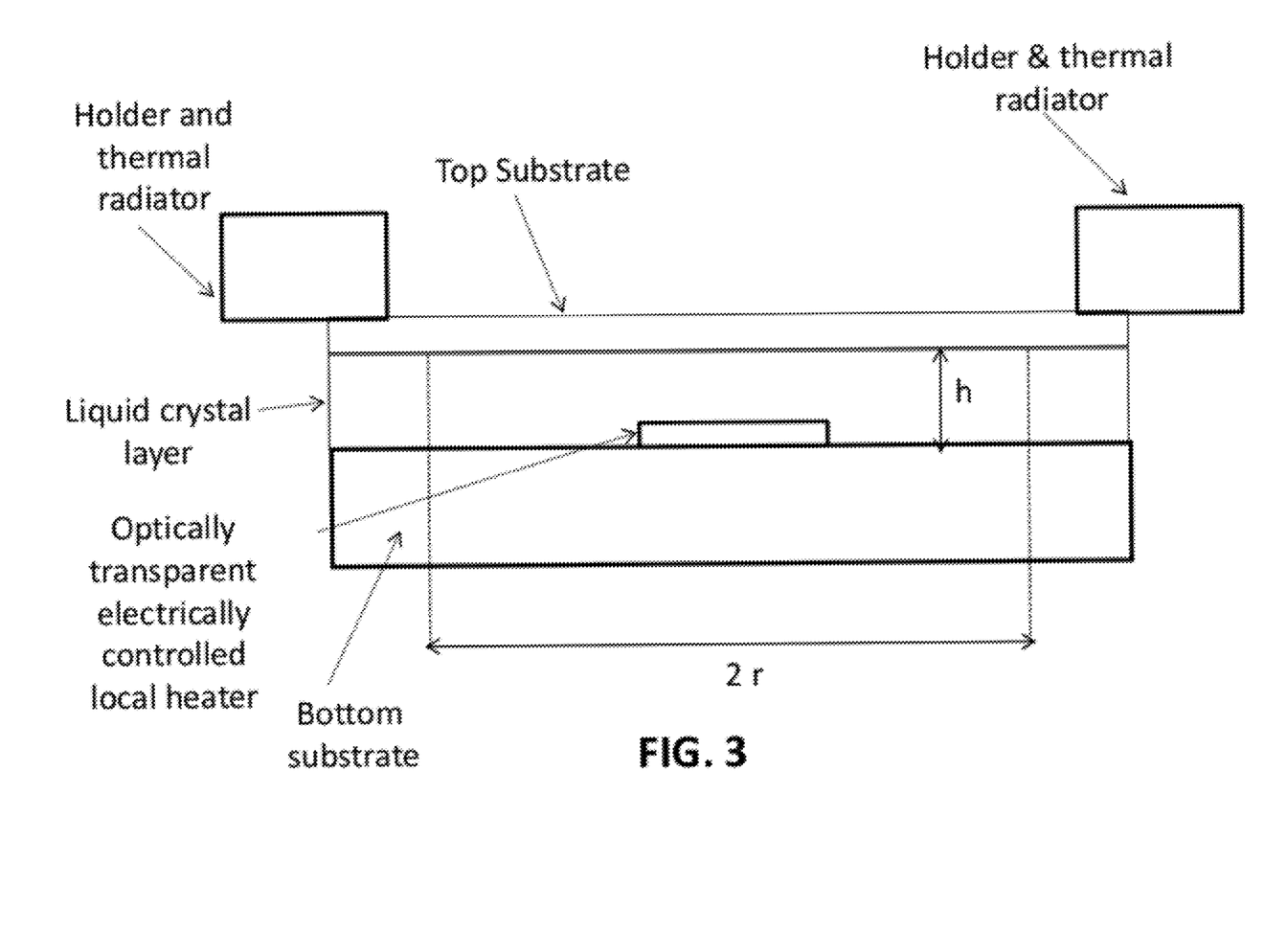
FIG. 3 is a schematic representation of a novel liquid crystal (LC) lens configuration, according to a non-limiting example of implementation of the present invention.

FIG. 3 is a schematic representation of a liquid crystal (LC) lens configuration, according to an example of implementation of the present invention. A planar layer of liquid crystal is arranged on top of a bottom substrate, and is itself coated with a top substrate. An optically transparent, electrically controlled local heater is arranged between the LC layer and the bottom substrate, positioned centrally with respect to the LC layer. A ring-shaped thermal radiator is arranged on top of the top substrate, proximate to a periphery of the LC layer. This thermal radiator, which may be implemented by any appropriate heat-radiating material (e.g. metal), act as a heat sink for cooling the top substrate and the LC layer.

Figure 4:
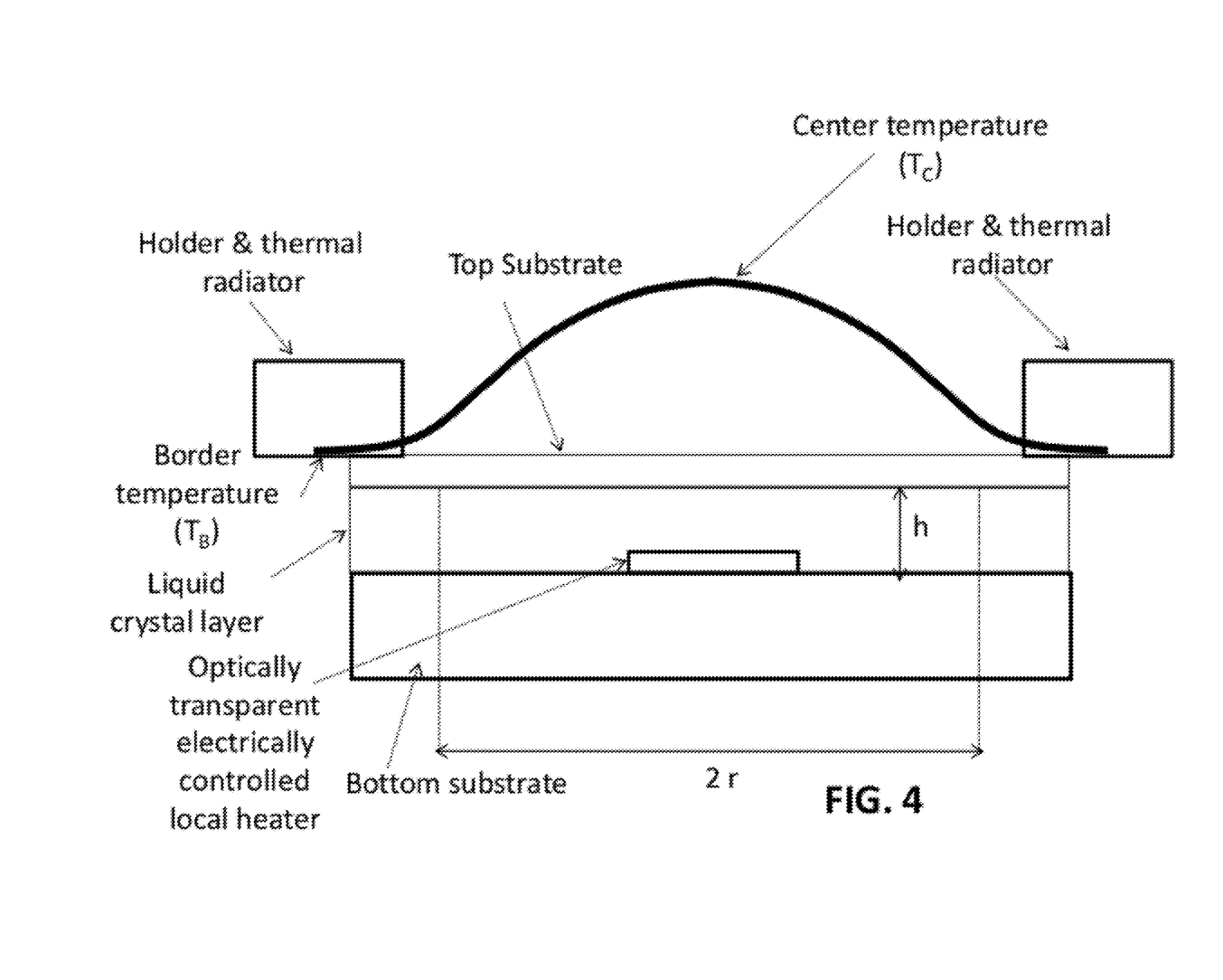
FIG. 4 illustrates the differential temperature gradient across the lens aperture, for the LC lens configuration shown in FIG. 3.

FIG. 4 illustrates an example of the variable temperature gradient across the LC lens that can be achieved by heating and cooling the substrate-coated LC layer with the heating system of FIG. 3. As shown, a peak temperature $T_C$ is obtained at the center of the lens aperture, while the temperature of the material at the border, $T_B$, is significantly lower as a result of the cooling by the thermal radiator.

Advantageously, the use of an annular thermal radiator to cool a portion of the substrate-coated LC layer, in combination with an electrically controllable local heater for applying heat directly to the center of the LC layer, provides for an improved control over the optical properties of the LC lens.

FIGS. 5 to 9 are schematic representations of variant LC lens configurations using the novel heating system described above, according to non-limiting examples of implementation of the present invention.

Figure 5:
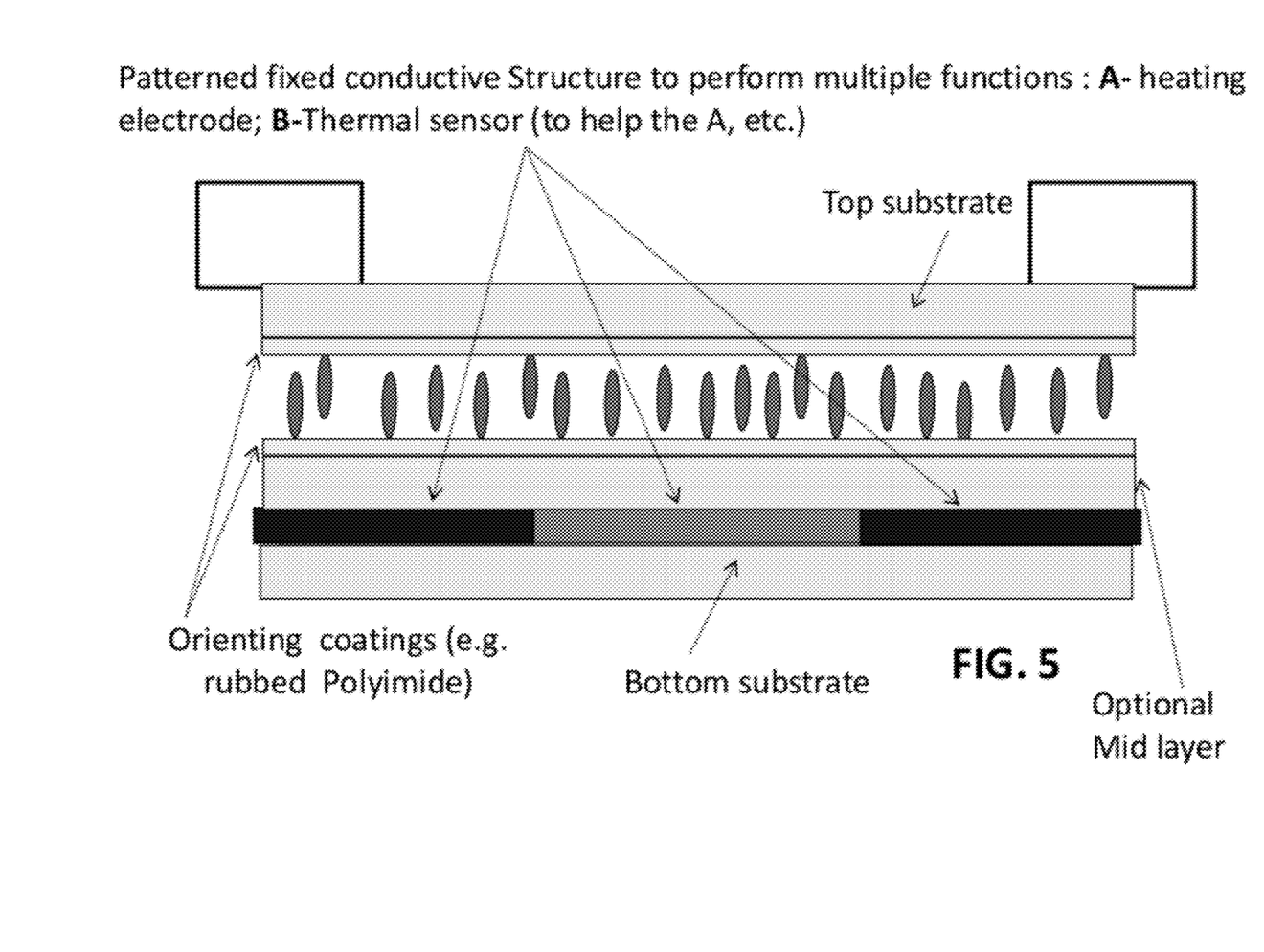
FIGS. 5 to 7 illustrate variant homeotropically aligned LC providing a positive tunable lens configurations in the case of positive optical anisotropy, according to non-limiting examples of implementation of the present invention, in which the liquid crystal cell director is in the normal direction to the substrates.

In FIG. 5, a patterned fixed conductive structure, formed of a fixed conductor electrode and an integrated, electrically-controllable heater, is arranged between the bottom substrate and the LC layer. This conductive structure may perform multiple functions, including heating of the electrode and thus of the LC material, as well as a thermal sensing function (to help with the heating function, etc). Advantageously, this configuration would not require two cross layers of LC to handle light polarization.

Figure 6:
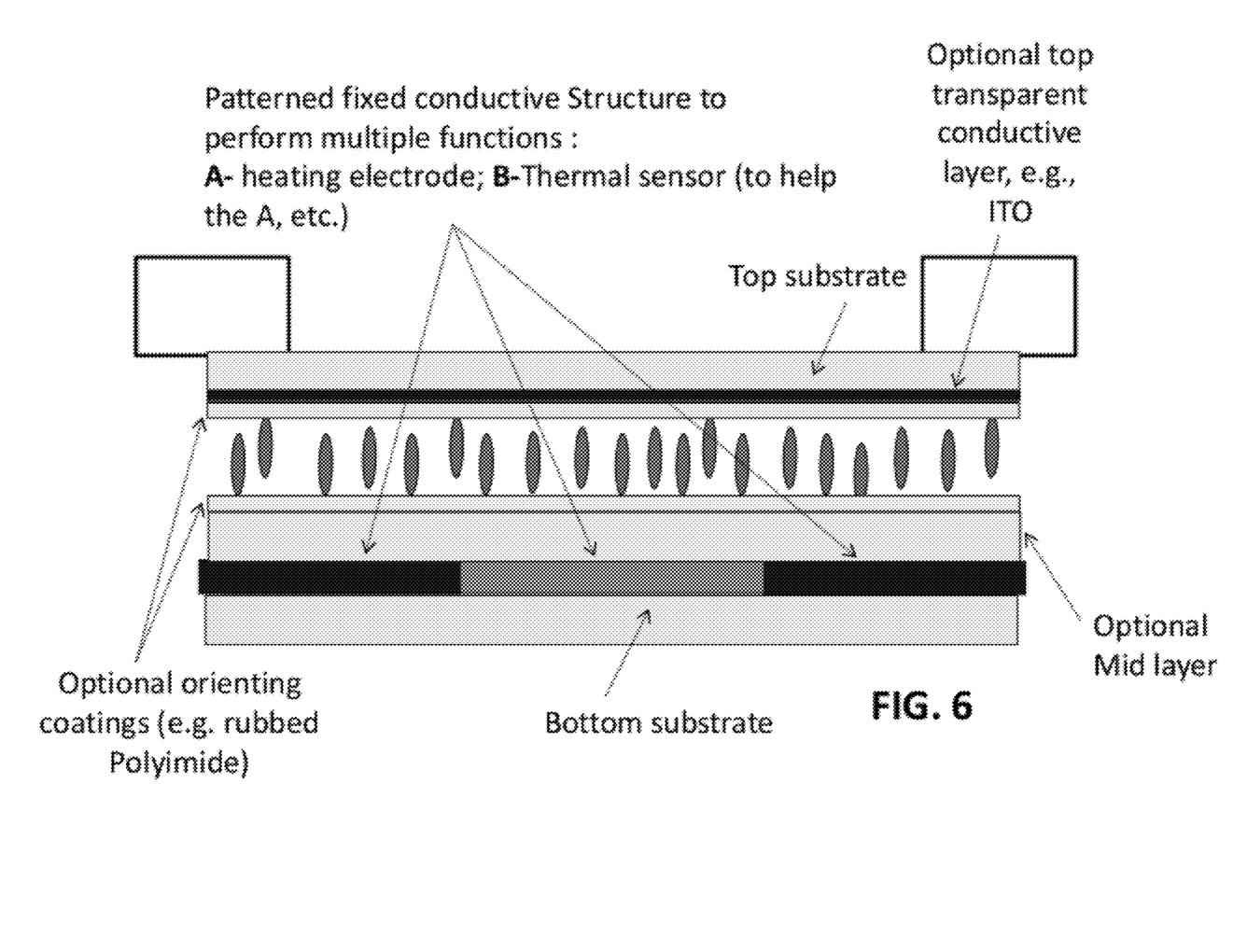

In FIG. 6, an additional top transparent electrode (e.g. ITO layer) is added to the lens configuration of FIG. 5. The electrode system formed of the top and bottom electrodes is operative to generate an electric field acting on the LC layer, in response to an applied drive signal. Advantageously, this configuration would not require two cross layers of LC to handle polarization. Furthermore, this configuration would allow a double control of the optical properties of the lens, notably electric and thermal control. In a specific example, for an initial planar alignment of the LC molecules and no electric field, a negative tunability can be achieved (by heating the electrode from the center). In another specific example, for an initial planar alignment of the LC molecules and a strong electric field (vertical alignment), positive tunability can be achieved.

Figure 7:
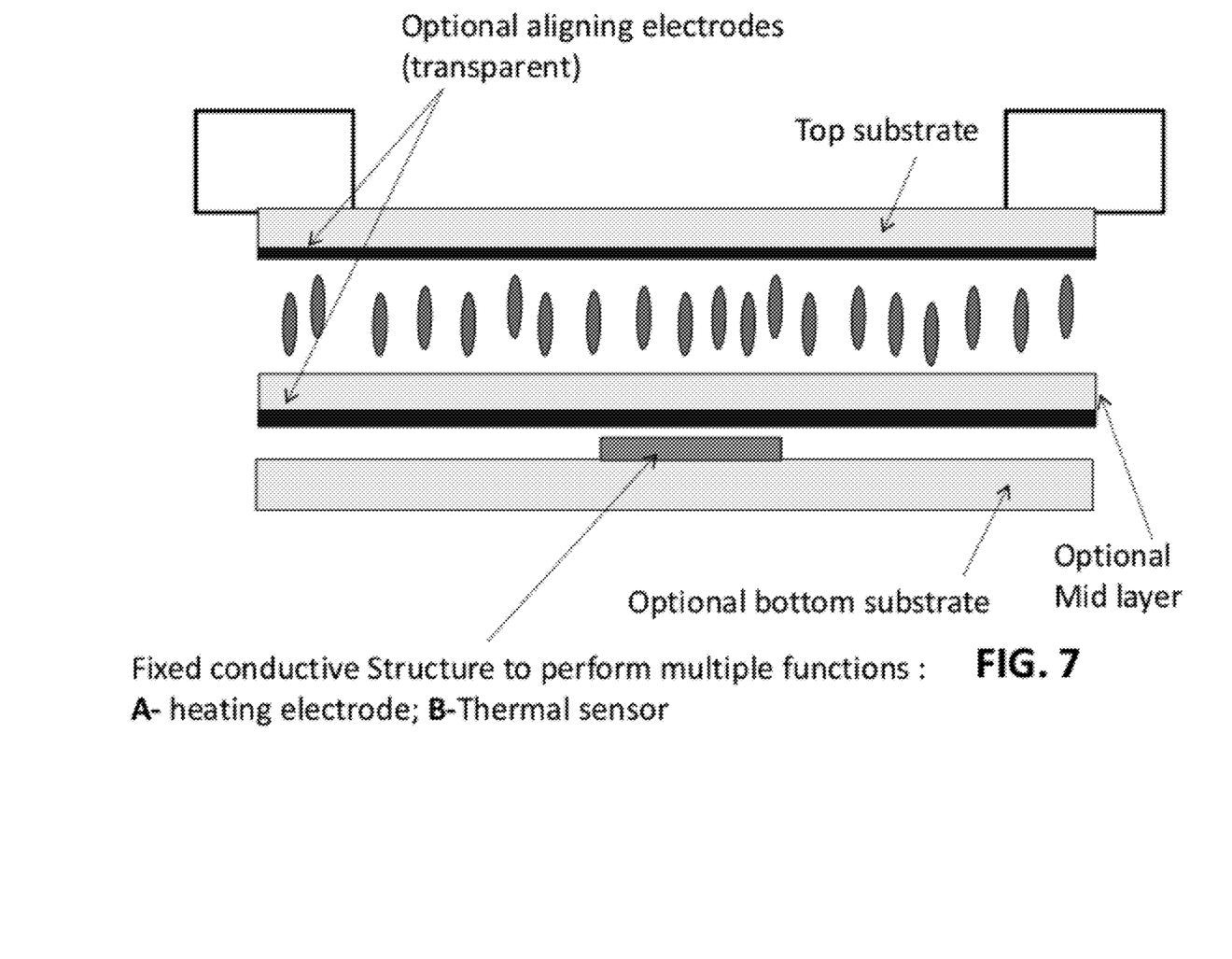

In FIG. 7, there is shown a simplified fabrication of the LC lens, without the alignment layers. In this case, the centrally-positioned local heater is separate from the bottom electrode (which is optional) and can itself perform multiple functions, including heating of the electrode and a thermal sensing function.

Figure 8:
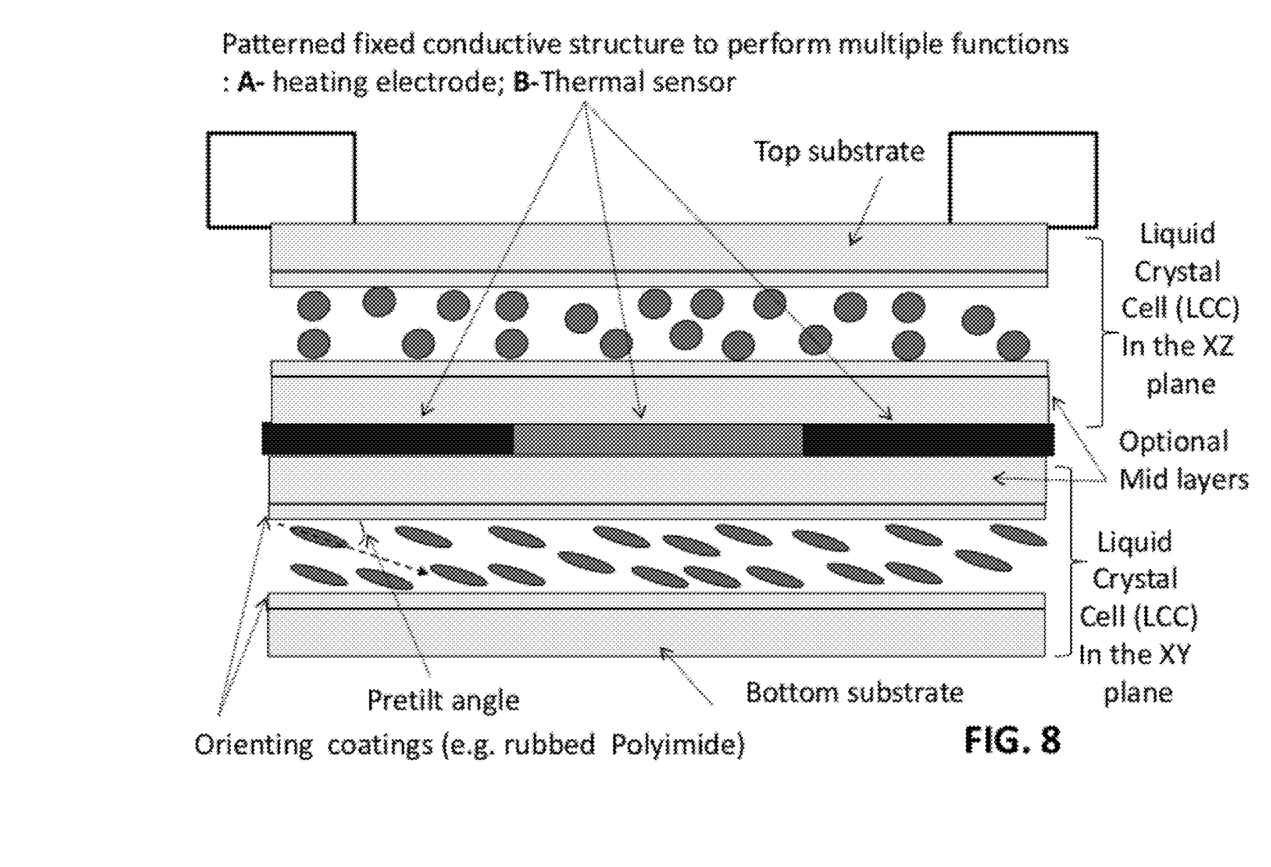
FIGS. 8 to 9 schematically illustrate alternative variants of LC lens configurations, according to non-limiting examples of implementation of the present invention.

In FIG. 8, the patterned fixed conductive structure of FIG. 5 is sandwiched between a pair of cross layers of LC and provides all of the above-described advantages. This configuration may provide useful modes of manipulation of light depending upon its polarization.

Figure 9:
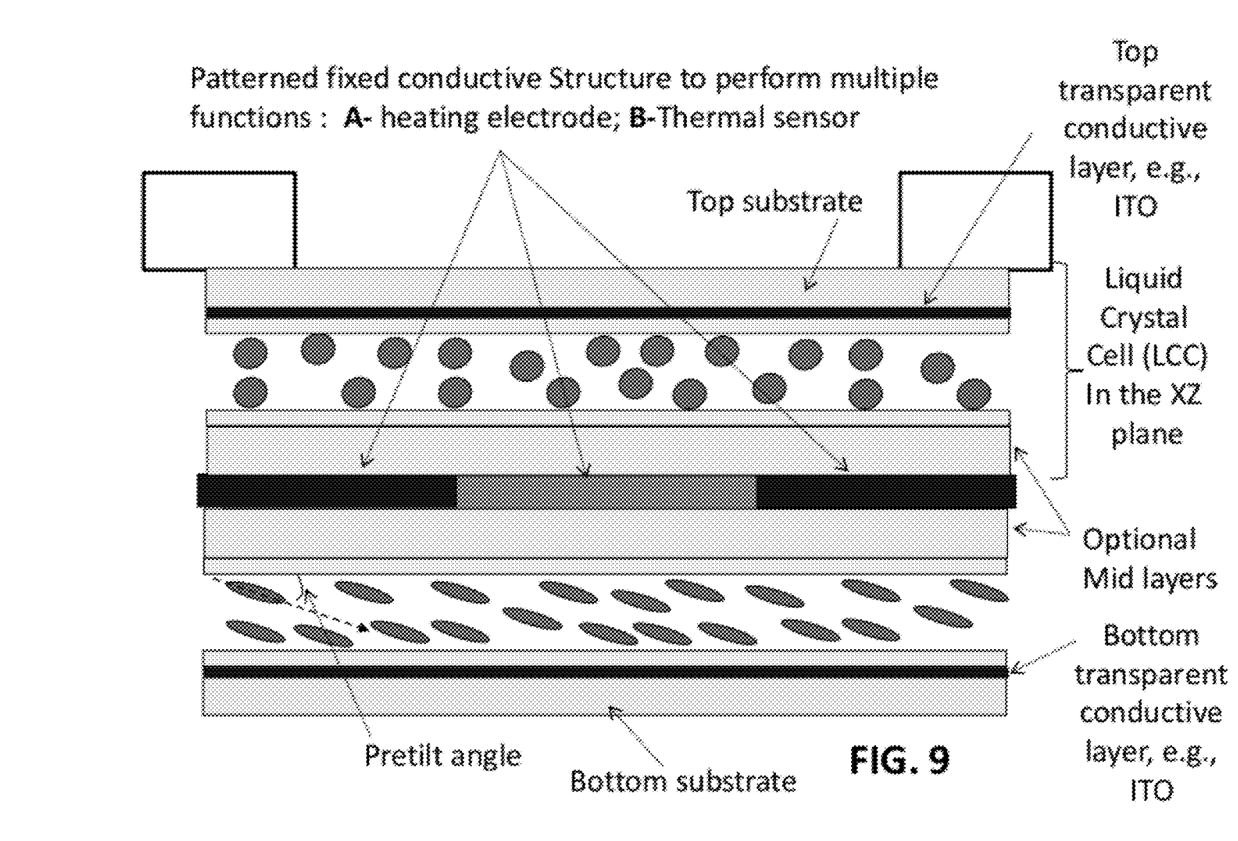

In FIG. 9, the LC cross layer lens configuration of FIG. 8 is adapted to include top and bottom electrodes. Accordingly, the two cross oriented LC layers compensate for the light polarization dependency and the patterned fixed conductive structure combined with the electrode structure provide for a double control (electric and thermal) of the lens optical properties. In a specific example, for an initial planar alignment of the LC molecules and no electric field, a negative tunability can be achieved (by heating the electrode from the center). In another specific example, for an initial planar alignment of the LC molecules and a strong electric field (vertical alignment), positive tunability can be achieved. The choice of the type of the liquid crystal (particularly of the temperature dependence of its refractive indexes $n_e$ and $n_o$) and the control zone of temperature changes will provide very rich control possibilities.

It is important to note that the above-described embodiments of the present invention have been presented for illustration purposes but that additional variants and modification are possible and should not be excluded from the scope of the present invention.

It should also be appreciated by the reader that various optical devices can be developed using the device described above.

What is claimed is:

1. A variable optical device for controlling the propagation of light, said device comprising:
   a. a body of liquid crystal optical material, said body having a center and a periphery;
   b. a heating system including:
      i. an electrically controllable heat source arranged adjacent said body of material, proximate to said center, for heating said body of material;
      ii. a thermal radiator arranged at said periphery for cooling a portion of said body of material;
   c. whereby said heating system is operative to generate a spatially modulated temperature gradient in said body of material, providing a desired light propagation behaviour.

2. A device as defined in claim 1, wherein said body of liquid crystal material has an essentially flat geometry.

3. A device as defined in claim 1, wherein said body of liquid crystal material has an essentially lens-shaped geometry.

4. A device as defined in claim 2, wherein said heater is integrated into a fixed conductive structure.

5. A device as defined in claim 2, further comprising an electrode system for generating an electric field acting on said body of liquid crystal material, said electrode system including a bottom electrode and top electrode, said body of liquid crystal material being arranged between said bottom and top electrodes.

6. A device as defined in claim 5, wherein said heater is integrated into said bottom electrode.

7. A device as defined in claim 5, wherein said electrode system provides for an electric control of optical properties, said heating system providing for a thermal control of optical properties.

8. A device as defined in claim 5, wherein said electrode system is essentially optically hidden and does not interfere with the propagation of light through said device.

9. A variable optical device for controlling the propagation of light, said optical device including a body of liquid crystal optical material having a variable optical property as a function of temperature, said optical device having its propagation of light controlled essentially by combined heating and cooling of said body of material.

10. A device as defined in claim 9, wherein said combined heating and cooling generates a spatially modulated temperature gradient in said body of liquid crystal optical material.

11. A device as defined in claim 10, wherein said liquid crystal optical material has an index of refraction sensitive to temperature.

12. A device as claimed in claim 9, wherein said device is a refractive lens.

13. A device as claimed in claim 9, wherein said device is a diffractive lens.

14. A device as claimed in claim 9, wherein said body of liquid crystal optical material has an essentially flat geometry.

15. A device as claimed in claim 1 which includes an integrated temperature sensor providing a feedback to the said heater to achieve a desired temperature level.

* * * * *